US012711083B2

(12) United States Patent
Witte

(10) Patent No.: US 12,711,083 B2
(45) Date of Patent: Aug. 18, 2026

(54) APPARATUS FOR PROCESSING INCOMING AND/OR OUTGOING DATA-ELEMENTS

(71) Applicant: TEConcept GmbH, Freiburg im Breisgau (DE)

(72) Inventor: Franz-Otto Witte, Kenzingen (DE)

(73) Assignee: TEConcept GmbH, Freiburg im Breisgau (DE)

( * ) Notice: Subject to any disclaimer, the term of this patent is extended or adjusted under 35 U.S.C. 154(b) by 0 days.

(21) Appl. No.: 18/945,022

(22) Filed: Nov. 12, 2024

(65) Prior Publication Data

US 2025/0068575 A1 Feb. 27, 2025

(30) Foreign Application Priority Data

Nov. 13, 2023 (DE) .................... 10 2023 131 518.8

(51) Int. Cl.
*G06F 3/00* (2006.01)
*G06F 13/20* (2006.01)

(52) U.S. Cl.
CPC .......... *G06F 13/20* (2013.01); *G06F 2213/40* (2013.01)

(58) Field of Classification Search
None
See application file for complete search history.

(56) References Cited

U.S. PATENT DOCUMENTS

2007/0194971 A1* 8/2007 Yamaji .................. H03M 1/123 341/155
2016/0273957 A1 9/2016 Bendelel et al.
2022/0152392 A1* 5/2022 Chang ................ A61N 1/36139
2022/0297849 A1* 9/2022 Rodriguez Robles ....................... G01M 5/0041

FOREIGN PATENT DOCUMENTS

DE 10 2010 050186 A1 5/2011
DE 102019110656 A1 12/2020
DE 102020123012 A1 3/2022
EP 0 907 913 B1 6/2002

OTHER PUBLICATIONS

Search Report issued in German Patent Application No. EP24207668.5 dated Mar. 25, 2025.
Search Report issued in German Patent Application No. 10 2023 131 518.8 issued Sep. 10, 2024.

* cited by examiner

*Primary Examiner* — Henry Tsai
*Assistant Examiner* — Dean Phan
(74) *Attorney, Agent, or Firm* — MARSHALL, GERSTEIN & BORUN LLP

(57) ABSTRACT

The invention relates to an apparatus (200) for processing incoming and/or outgoing data-elements (11) cyclically, the data-elements (11) representing numerical and/or logical values that are linked to an upper-layer application.

16 Claims, 14 Drawing Sheets

TCLA Composer layout example

Outputs

Postprocessing

Combiner

Preprocessing

Logic Processing

Inputs

Figure 9

Figure 10
Edit
Block type
Name prcallpass_1_chain
Operation ID 5
Description First order allpass filter chain
Version 1
Inputs and outputs
Levels
Path
Load values
Save values
Value arrays
Coefficients
DelayLine
Maximum size 256 Type Single
Rows 5
Name Value
b_1 0.596
b_2 0.935
b_3 -0.596
b_4 0.935
b_5 0

APPARATUS FOR PROCESSING INCOMING AND/OR OUTGOING DATA-ELEMENTS

Figure 1:
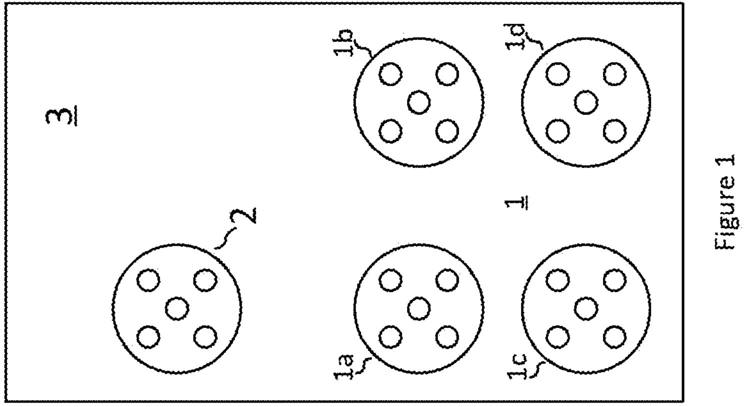

The present invention relates to an apparatus for processing incoming and/or outgoing data-elements. Furthermore, the invention relates to a system, a method, a computer program, a data processing apparatus as well as a computer-readable storage medium.

STATE OF THE ART

IO-Link is a communication protocol that is standardized in IEC 61131-9. It is typically used in industrial fieldbus environments to connect sensors or actuators with various fieldbus systems. Special linking devices called IO-Link masters are used to connect IO-Link devices to various fieldbus systems. The IO-Link communication is based on a simple point-to-point protocol. Thus, IO-Link devices only need to support a single, simple interface and can still interact with a variety of host systems via a suitable IO-Link master. IO-Link masters do not only exist for fieldbuses, but also for other client systems like web browsers, MQTT Servers, artificial intelligence cloud systems as well as other IT-based technologies like OPC UA or JSON.

Information that is transferred over IO-Link is based on telegrams that are called m-sequences. An m-sequence is always initiated by an IO-Link master with a first part at predefined periods or cycles and answered by the IO-Link Device answers with a second part. M-sequences contain data elements that are transferred in every cycle. These data elements are called cyclic data or process data. They also contain elements that are typically spread over multiple cycles. These elements are transferred only on request—that's why they are called on-request or acyclic data. On-request data are for example used for parameters or event messages.

Different m-sequence types are used to specify different fixed sized data elements. Which m-sequence types are used during the IO-Link communication is defined by the IO-Link devices. An IO-Link master with for example 8 IO-Link ports allows the connection of up to 8 IO-Link devices. The features of the connected IO-Link devices are described in electronic data sheets called IO-Link Device Descriptor "IODD" files. Every IO-Link device type is uniquely identified by an address consisting of a 16-bit Vendor ID and a 24-bit Device ID. This identification is listed in the IODD and can in addition read out via the IO-Link protocol from the IO-Link device.

The current IO-Link system is very successful and is widely used, especially in combination with fieldbus systems and programmable logic controllers 'PLCs'.

There are various disadvantages associated with the use of communication systems, particularly IO-Link. This includes, for example, the case of a lack of master ports. This occurs when additional sensors or actuators need to be added for extended or improved functionality, and all ports of the current master are already in use, and adding a new master is not sufficient. Another disadvantage arises when a given device needs to be replaced by a similar one with similar or comparable features but a different cyclic data structure.

It is another challenge to provide low latency feedback from a sensor to an actuator without using PLCs as clients. It can be also challenging to implement simple sequencing as an extension to the low latency feedback, which includes execution loops and decisions. It is another challenge to meet the requirements of clients who need data in a specific, preprocessed data format that is not provided by the connected IO-Link Device.

Existing solutions are devices like the "Balluf BNI IOL-302-002-K006" allow to extend an IO-Link device with an extender port. However, these solutions are not generic, as only specific devices can be connected to the extender port.

DISCLOSURE OF THE INVENTION

According to aspects of the invention, an apparatus, a system, a method, a computer program, a data processing apparatus as well as a computer-readable storage medium are provided. Further features and details of the invention are disclosed in the respective dependent claims, the description, and the drawings. Features and details described in the context to the apparatus according to the invention also correspond to the system, the method, the computer program, the data processing apparatus as well as the computer-readable storage medium, and vice versa in each case.

According to an aspect of the invention, an apparatus for processing incoming and/or outgoing data-elements, particularly cyclically, is provided. The data-elements may represent numerical and/or logical values that are linked to, particularly are specific for, an upper-layer application, for example an industrial automation application and/or a control and/or evaluation of sensors and/or actors. In other words, the numerical and/or logical values may be used and particularly evaluated and/or generated in the upper-layer application, for example for controlling an automation system. The apparatus may be configured as an electronic device and/or as a computer system and/or may comprise a computer program.

The apparatus may comprise a distributor block, also referred to as distributor, for converting at least one or more (of the) data-elements after a linear operation (on the data-elements) into at least one or more input scalar signals, also referred to as input scalars, of a generic data type, in particular an IEEE 754 float and/or, after an additional quantization, into at least one or more bool signals, also referred to as bools or Boolean signals. The distributor block may be configured as at least a part of a computer program and/or an electronic circuit.

The apparatus may comprise a combiner block, also referred to as combiner, for performing at least one or multiple combining operations. Each combining operation may comprise combining at least one or more of the input scalar signals into one (single) output scalar signal. In other words, the combining operation can combine multiple input scalar signals to create a single output scalar signal, also referred to as output scalar. Therefore, in case multiple combining operations are performed, each of them may create a single output scalar signal that originates from the combination of at least one or more of the input scalar signals. The combiner block may be configured as at least a part of a computer program and/or an electronic circuit.

The apparatus may comprise a merger block for reconverting (or converting) at least one or more of the output scalar signals and/or of the bool signals and/or of another output based on these signals into one or more data-elements after a linear operation and/or a quantization step, particularly on these signals/outputs. In other words, the merger block may reconvert the outgoing signals or bools into one or more data-elements after a linear operation and an optional quantization step. The merger block may be configured as at least a part of a computer program and/or an electronic circuit.

The apparatus may comprise a logic block for performing logic operations on at least one or more of the bool signals and particularly for providing both input and output for the bool signals. In other words, the logic block may carry out logic operations on bool signals and may provide both inputs and output of bool signals. The logic block may also be configured as at least a part of a computer program and/or an electronic circuit.

The apparatus may further comprise processing blocks that may be inserted between the distributor block and the combiner block, particularly into one or more input scalar signals, or between the combiner block and the merger block, particularly into one or more output scalar signals. In other words, the processing blocks may process the input/output scalar signals, in which it was inserted. The processing blocks may be inserted into the input scalar signals individually or collectively. Each of the processing blocks may be configured as at least a part of a computer program and/or an electronic circuit.

The apparatus may use the described structure of blocks to provide a configure logic adapter, and thereby allow for a flexible, reliable and easy-to-configure processing of data elements. The apparatus may particularly be configured as an aggregator device and/or an IO-Link device and/or a fieldbus device and/or a network device and/or a communication device.

The apparatus according to the invention may be configured as a communication device, particularly an IO-Link device and/or for a communication system, that is configured to connect to a master device, particularly IO-Link master, and to at least one secondary device, particularly another type of IO-Link device. The master device may provide a communication system like IO-Link for the data exchange with the secondary devices. A communication system may refer to a digital communication network that allows for real-time data exchange between the secondary devices in the form of industrial devices such as sensors, actuators, and controllers. It can for example be used to connect devices in a manufacturing or process control environment, allowing for efficient and reliable communication between devices. The communication system may be configured as a point-to-point communication system and thereby distinguishes itself from fieldbus systems. To this end, particularly IO-Link uses an IO-Link master to connect (point-to-point) to one or more IO-Link devices, i.e., sensors or actuators. The IO-Link master may provide the interface to an upper-level unit like the higher-level controller (PLC) and controls the communication with the connected IO-Link devices. An IO-Link master may have one or more IO-Link ports to which only one device can be connected at a time. This can also be a "hub" which, as a concentrator, enables the connection of classic switching sensors and actuators. Furthermore, the communication system may be configured as a wired communication system. In contrast to a wireless solution, the communication system may therefore use cables to establish the physical connection between ports of the master and the devices.

Usually, a (primary) master device is used to interface between various fieldbus—or similar systems and multiple (secondary) devices. The master may be responsible for controlling the, particularly IO-Link, communication with the secondary devices, including the transmission of data, configuration, and parameterization. Optionally, the master may also provide power to the secondary devices, enabling a simplified and cost-effective wiring. The master may also be active peer connected through ports to one up to n (secondary) devices and provide an interface to the gateway to the upper-level communication systems or upper-level units like PLCs (Programmable logic controller).

IO-Link particularly refers to a standardized communication protocol that is standardized in IEC 61131-9 and used to connect sensors and actuators to industrial automation systems. It may enable bi-directional communication between devices and the control system, allowing for real-time data exchange and parameterization. IO-Link is supported by a wide range of industrial equipment suppliers. This makes it a cost-effective and flexible solution for industrial automation applications.

A MCU (short for microcontroller unit) may be used to execute software, i.e., at least one computer program, particularly computer program according to the invention, and/or referred to as application. The MCU may comprise a processor, memory, and input/output peripherals. The application may realize a Standard Master Interface (SMI) for the upper-level communication and an IO-Link master interface for communication with the devices. Information that is transferred over IO-Link may be based on telegrams that are called m-sequences. An m-sequence may always be initiated by an IO-Link master with a first part at predefined periods or cycles and answered by the IO-Link Device answers with a second part. M-sequences may contain data elements that are transferred in every cycle. These data elements are called cyclic data or process data. They also contain elements that are typically spread over multiple cycles. These elements may be transferred only on request—that's why they are called on-request or acyclic data. On-request data are for example used for parameters or event messages. The processing unit of the apparatus according to the invention may also be configured as (another) MCU.

Different m-sequence types may be used to specify different fixed sized data elements. Preferably, which m-sequence types are used during the IO-Link communication is defined by the IO-Link devices. If an IO-Link master sends process data "PD" to an (secondary) device, these data may be called in the IO-Link interface and system specification PDOut. If an IO-Link Master receives PD these data may be called PDIn. The total size of the Process data for an IO-Link Device is particularly limited to 32-bytes PDOut and 32-bytes PDIn. If the direction of the data flow is not important for a consideration, the suffices In/Out can be skipped in the subsequent description.

A PHY may be provided that is particularly a specific electrical circuit that is connected to the MCU. It modifies the electrical characteristics of MCU-signal into signals that are in conformity with the physical layer of IO-Link. Thus, the PHY particularly refers to the physical layer of the communication protocol. It may be the first layer of the ISO-OSI reference model, which provides the mechanical, electrical, functional, and procedural means to active, maintain, and de-activate physical connections for bit transmission between data-link entities. It may be responsible for the transmission of the electrical signals over the physical medium, such as wires or cables, between the IO-Link master and the IO-Link device. The PHY layer may define the electrical characteristics of the communication, such as the voltage levels, signal timing, and signal encoding, and ensures reliable and accurate data transmission.

The physical layer may make use of a 3-wire connection system, wherein the three lines are used as follows: one for the power supply, one for the ground line, and one (C/Q) for the switching signal or SDCI (Single-drop digital communication interface) communication. The physical layer is responsible for configuring the C/Q line and associated line driver and receiver for a specific port.

For the apparatus and/or method according to the invention, it is further possible that the processing blocks are configured to process the one or more input scalar signals and/or the one or more output scalar signals, for which they were inserted, particularly processing blocks that perform digital filtering operations or spectral transforms like fast Fourier transforms. Therefore, the processing blocks may be structured in such way that the number of scalar signals is maintained, which enables a stable and resource-saving processing.

It is also possible that the blocks are configured to be processed in a well-defined order, preferably in a way that any input scalars of a current block are evaluated before the current block is evaluated. This can have the advantage that the processing of the blocks is more reliable and/or resource-saving, and particularly that the results of the previous blocks can be used as input for the subsequent blocks in the same cycle. This may increase the overall accuracy of the system and reduces the likelihood of errors.

It is also possible that the apparatus is configured to process the incoming and/or outgoing data-elements cyclically in a way that the bool signals that are evaluated in one cycle are given as input for a subsequent block in the following cycle. This can have the advantage that the processing of the data-elements is more efficient and faster, as the bool signals may continuously passed on without unnecessary delays.

It is also possible that at least one of the blocks, particularly the logic block, is configured based on a configuration specification. The configuration specification may be customizable by a user, thereby rendering the processing and particular the logic operations and/or the insertion of the processing blocks configurable. The configuration specification may particularly be stored in a storage medium. It is also possible that the configuration takes place by loading a memory dump into the apparatus. The configuration in the memory dump can then be linked resource-efficiently to the operation of the device.

It is also possible that the apparatus provides a configurable logic adapter that uses a configurable logic to process, preferably convert and/or select, the data elements of data received from at least one or multiple secondary devices and processes and/or combines the data elements to generate data to be sent to a master device. This allows the apparatus to provide communication between the devices, for example, for data aggregation.

It is also possible that the apparatus comprises and/or provides an interface, particularly an electronic and/or graphical and/or human machine interface. The interface may be provided to configure the processing and particularly a configurable logic by a user, thereby adapting the processing of the data elements to the upper-layer application, particularly an evaluation and/or control of at least one or multiple secondary devices, particularly sensors and/or actuators.

Another aspect of the invention is a system for providing a communication in an automation system. The system may comprise at least one of the following:

- an upper-level unit, e.g., a programmable logic controller, for providing an upper-layer application, particularly an automated control of industrial processes of the automation system,
- a master device for being connected to the upper-level unit, particularly programmable logic controller, for providing a communication system,
- at least one or multiple secondary devices for being controlled and/or evaluated by the upper-level unit, particularly programmable logic controller, via the master device, thereby carrying out the upper-layer application at least partially,
- the apparatus according to the invention for connecting the at least one or multiple secondary devices to the master device, thereby providing a data exchange for the control and/or evaluation of the secondary devices via the communication system.

Another aspect of the invention is a method for processing incoming and/or outgoing data-elements cyclically. As described above, the data-elements may represent numerical and/or logical values that are linked to an upper-layer application. The method may comprise the, or at least one of the, following steps that are particularly performed cyclically:

- converting at least one or more (of the) data-elements after a linear operation into at least one or more input scalar signals of a generic data type, in particular an IEEE 754 float and/or, after an additional quantization, into at least one or more bool signals, the converting may particularly be carried out by a distributor block,
- performing at least one or multiple combining operations, each combining operation may comprise to combine at least one or more of the input scalar signals into one (single) output scalar signal, the combining operations may particularly be performed by a combiner block,
- reconverting at least one or more of the output scalar signals and/or of the bool signals and/or of an output based on these signals into one or more data-elements after a linear operation and/or a quantization step, the reconverting may particularly be carried out by a merger block,
- performing logic operations on at least one or more of the bool signals and particularly providing both input and output for the bool signals, the logic operations may particularly be performed by a logic block,
- inserting processing blocks, particularly into one or more input scalar signals, between the distributor block and the combiner block or, particularly into one or more output scalar signals, between the combiner block and the merger block.

Thus, the method according to the invention brings the same advantages as have been described in detail with reference to an apparatus according to the invention. The method steps may be carried out at least partially by a computer program and/or an electronic circuit. To this end, each of the blocks described above may be configured as part of the computer program and/or electronic circuit.

It is possible that the processing blocks process the one or more input scalar signals and/or the one or more output scalar signals, for which they were inserted. Alternatively, or additionally, it is possible that the number of scalar signals is not changed, when passing processing blocks. This has the advantage of an efficient processing using an apparatus with limited resources.

It is possible that the blocks are processed in a well-defined order, preferably in a way that any input scalars of a current block are evaluated before the current block is evaluated. Alternatively, or additionally, it is possible that the bool signals that are evaluated in one cycle are given as input for a subsequent block in the following cycle. This also allows for an efficient processing using an apparatus with limited resources.

It is possible that the processing of the data-elements comprises:

Inputting the data elements to a group of processing blocks, thereby generating an output of the group of processing blocks, Generating modified data-elements based on the output of the group of processing blocks, wherein connections and/or a structure of the group of processing blocks may be defined by a customizable configuration of a logic.

The apparatus may also be configured for connecting at least one or multiple secondary devices to a master device. The apparatus may be configured as an IO-Link-capable-device for being interposed between the at least one or multiple secondary devices, each configured as an IO-Link device, and the master device, configured as an IO-Link master. The apparatus may comprise a device port, configured to connect to the master device. Furthermore, the apparatus may comprise at least one or multiple master ports, configured to connect to the at least one or multiple secondary devices. Also, it is conceivable that the apparatus comprises a processing unit, configured to establish a data communication with the master device via the device port, and to establish a data communication with the secondary devices via the at least one or multiple master ports, thereby providing an exchange of data between the secondary devices and the master device via the apparatus with each data communication being configured as a point-to-point communication. Furthermore, the processing unit may be configured to process, preferably aggregate, the data received from the at least one or multiple secondary devices for the point-to-point communication with the master device via the device port using a configurable logic. The processing unit may also be configured to carry out the steps of a method according to the invention.

Another aspect of the invention may be a method for connecting at least one or multiple secondary devices to a master device via an apparatus, the method comprising the following steps, particularly carried out by the apparatus according to the invention and/or the system according to the invention:

Receiving data from the at least one or multiple secondary devices via at least one or multiple master ports of the apparatus, the at least one or multiple master ports being configured to connect to the secondary devices, particularly by wire, Processing the received data for a point-to-point communication of the apparatus with the master device, the processing being carried out using a using a configurable logic, Providing modified data based on the processing, the modified data being specific for the data received from each of the at least one or multiple secondary devices and for a current configuration of the logic, Sending the modified data to the master device via a device port of the apparatus, the device port being configured to connect to the master device, particularly by wire.

In another aspect of the invention a computer program may be provided, in particular a computer program product, comprising instructions which, when the computer program is executed by a computer, cause the computer to carry out the method according to the invention. Thus, the computer program according to the invention can have the same advantages as have been described in detail with reference to a method according to the invention.

The computer may be a data processing device which executes the computer program. The computer may include at least one processor that can be used to execute the computer program. Also, a non-volatile data memory may be provided in which the computer program may be stored and from which the computer program may be read by the processor for being carried out.

According to another aspect of the invention a computer-readable storage medium may be provided which comprises the computer program according to the invention. The storage medium may be formed as a data storage device such as a hard disk and/or a non-volatile memory and/or a memory card and/or a solid-state drive. The storage medium may, for example, be integrated into the computer.

Furthermore, the method according to the invention may be implemented as a computer-implemented method.

Further advantages, features and details of the invention will be apparent from the following description, in which embodiments of the invention are described in detail with reference to the drawings. In this connection, the features mentioned in the claims and in the description may each be essential to the invention individually or in any combination. Showing:

FIG. 1 Parts of an apparatus according to embodiments of the invention.

Figure 2:
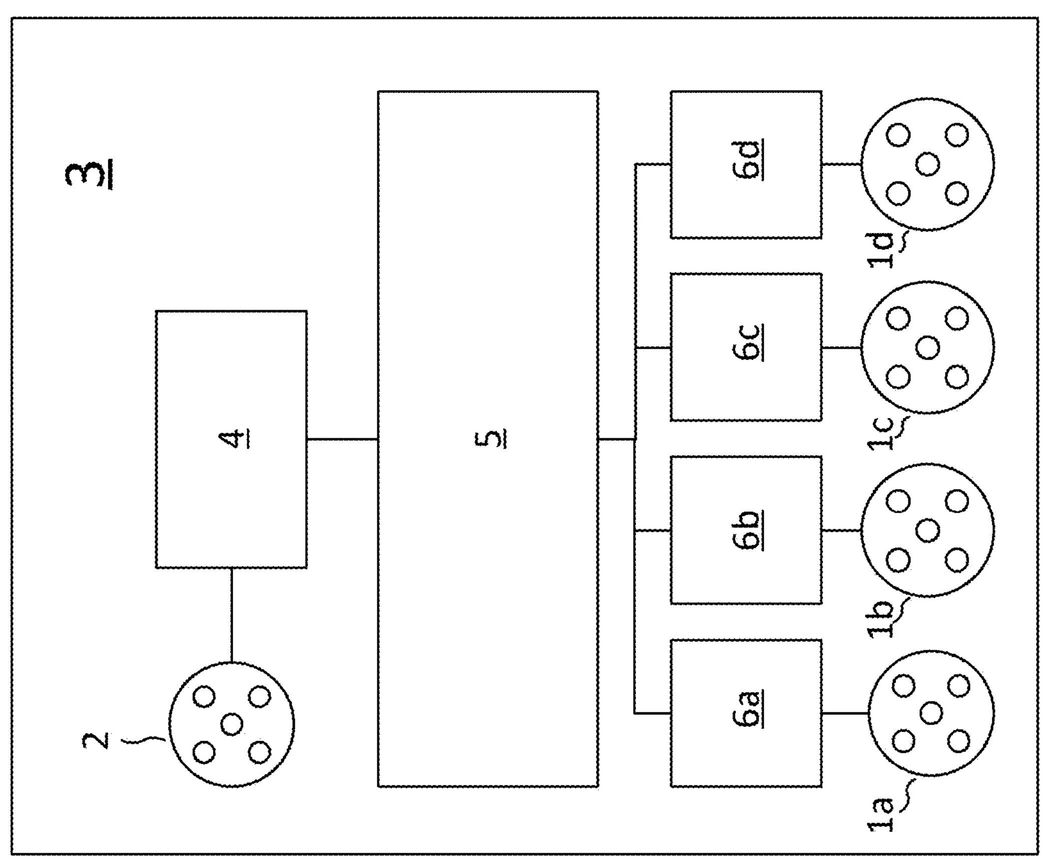

FIG. 2 Further parts of an apparatus according to embodiments of the invention.

FIG. 3A visualization of a method according to embodiments of the invention.

Figure 4:
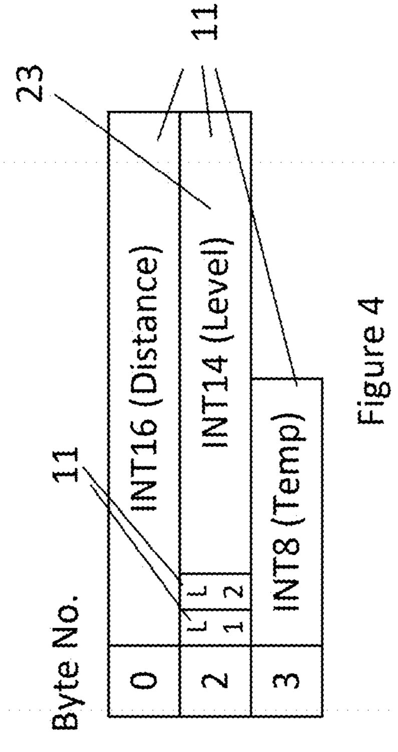

FIG. 4 An example of an IO-Link process data structure.

FIG. 5-13 Further visualizations of a method according to embodiments of the invention and of an apparatus according to the invention.

FIG. 14A method, a computer program, a processing apparatus as well as a storage medium according to embodiments of the invention.

Figure 5:
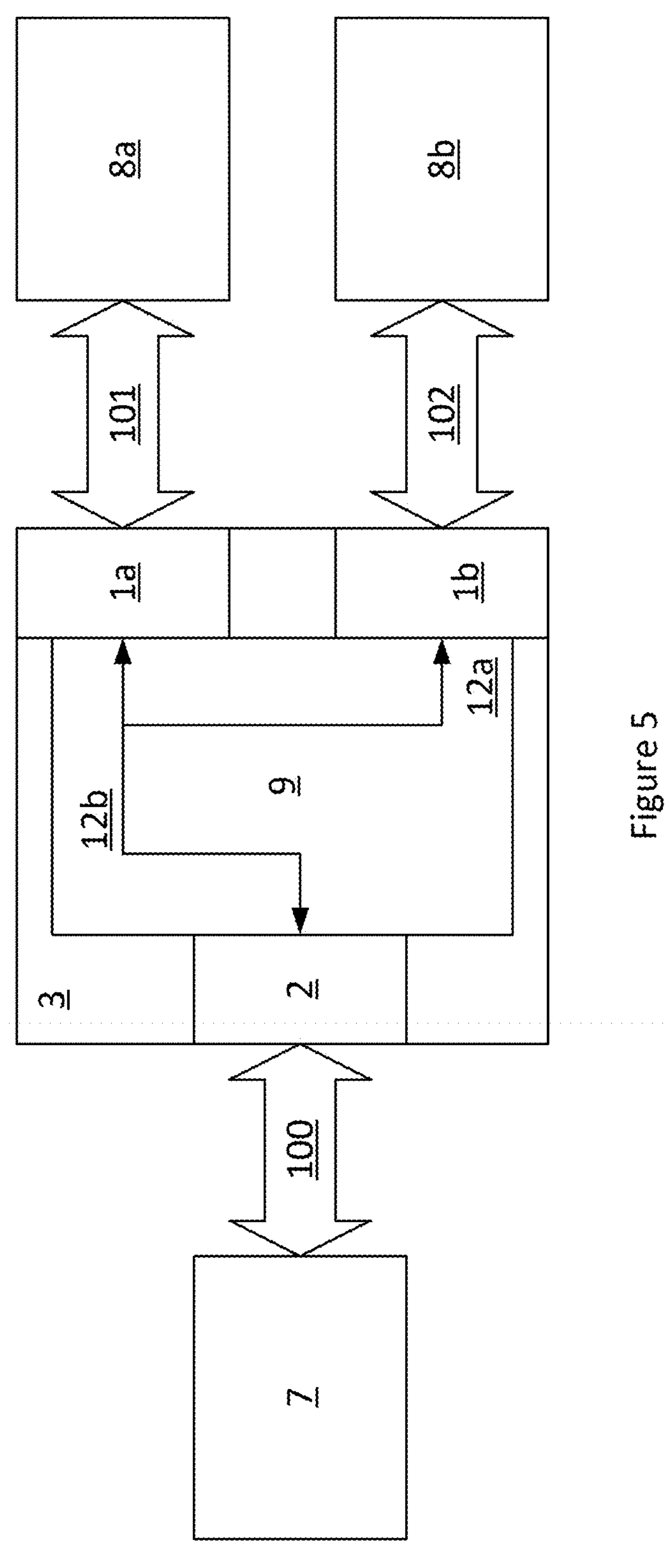
Figure 6:
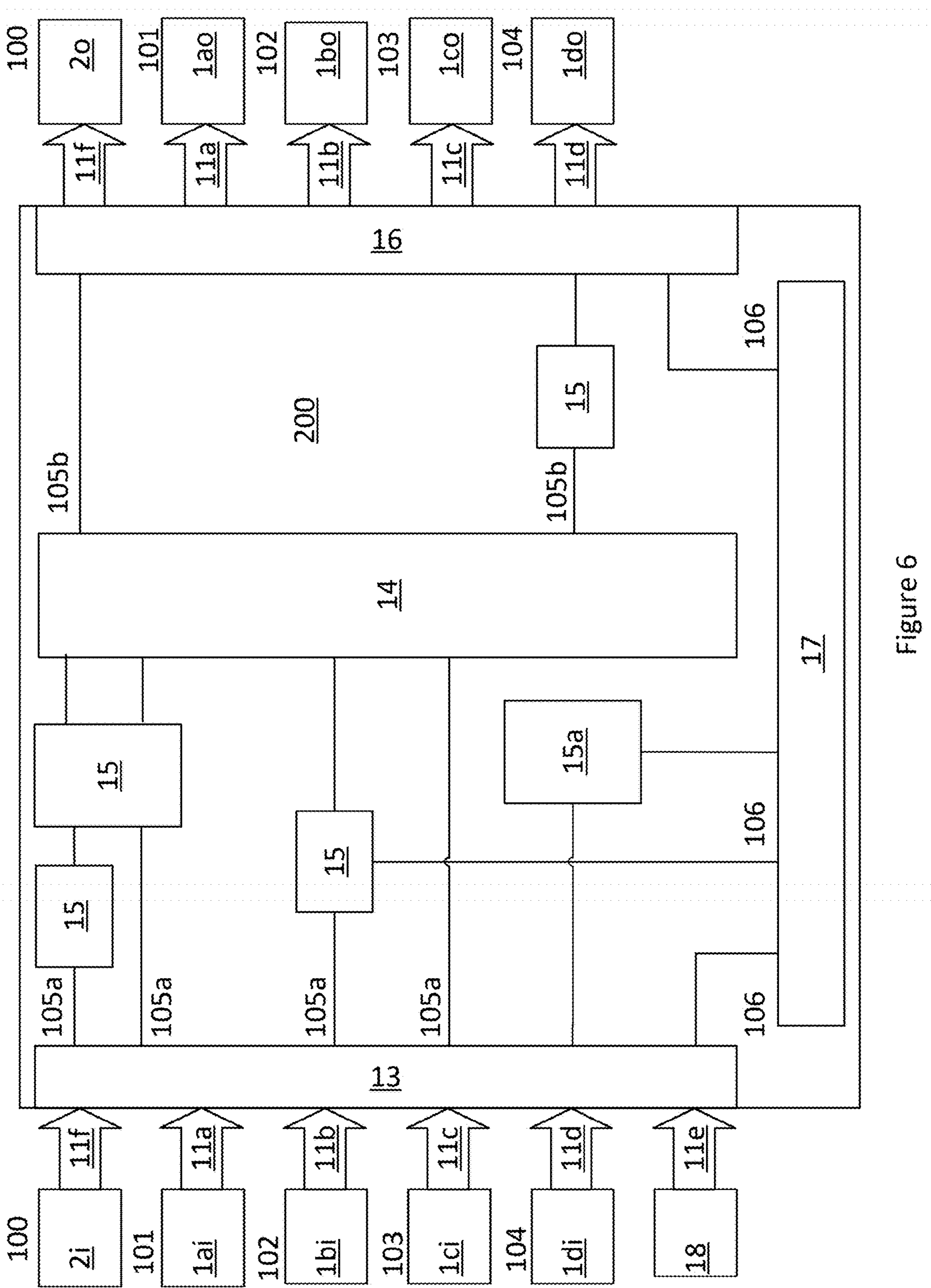

FIG. 1-14 and particularly FIG. 6 shows an apparatus 200 according to embodiments of the invention for processing incoming and/or outgoing data-elements 11 cyclically. The data-elements 11 may represent numerical and/or logical values that are linked to an upper-layer application. The apparatus 200 may comprise a distributor block 13, particularly a distributer group, that converts at least one or more of the data-elements 11 after a linear operation into at least one or more input scalar signals 105*a* of a generic data type, in particular an IEEE 754 float and/or, after an additional quantization, into at least one or more bool signals 106. Furthermore, the apparatus may comprise a combiner block 14 that performs at least one or multiple combining operations, each combining operation comprising combining at least one or more of the input scalar signals 105*a* into one output scalar signal 105*b*. Also, the apparatus may comprise a merger block 16 that reconverts at least one or more of the output scalar signals 105*b* and/or of the bool signals 106 and/or of an output based on these signals 105*b*, 106 into one or more data-elements 11 after a linear operation and/or a quantization step. The apparatus may also comprise a logic block 17 that performs logic operations on at least one or more of the bool signals 106 and particularly provides both input and output for the bool signals 106. Also, the apparatus may comprise processing blocks 15 that are configured to be inserted, particularly into one or more input scalar signals 105*a*, between the distributor block 13 and the combiner block 14 or, particularly into one or more output scalar signals 105*b*, between the combiner block 14 and the merger block 16.

There a several scenarios that fail for conventional IO-Link setups. A first and simplest failing scenario is the lack of IO-Link Master ports in a given industrial set up. This scenario shows up when additional sensor or actuators need to be added for extended or improved functionality and all ports of the current IO-Link master are used and adding an additional master is inappropriate. A second failing scenario shows up, when a given device needs to be replaced by a similar one with similar or comparable features but different cyclic data structure. A third failing scenario comes from the requirement of low latency feedback from a sensor to an actuator, especially in configurations where no PLCs are used as clients. Simple sequencing is an extension to the low latency feedback which provides means for execution loops and decisions. A fourth failing scenario arises with clients of the IO-Link system that requires data in a specific possibly preprocessed format that is not in line with the data format provided by the connected IO-Link Device. These scenarios will be solved by embodiments of the invention, particularly referred to as aggregator device 'AGG' and the comprised configurable logic adapter 'CLA'.

FIG. 1 shows a schematic exemplary view of the AGG device 3 with one device port 2 that can be connected to an IO-Link master 7 and a number of master ports 1*a* to 1*d* that can be connected to IO-Link Devices 8.

FIG. 2 shows the core components of an AGG Device according to embodiments of the invention. The Device PHY4 is an electronic circuitry that converts IO-Link signals exchanged with an external IO-Link Master 7 via Device Connector 2 into signals that are compatible with the Micro Controller Unit 5 "MCU". The Micro Controller Unit executes software for data exchange with an external master 7 and it executes software to exchange data via Master PHYs6 and Master Ports 1 IO-Link Devices 8.

Figure 3:
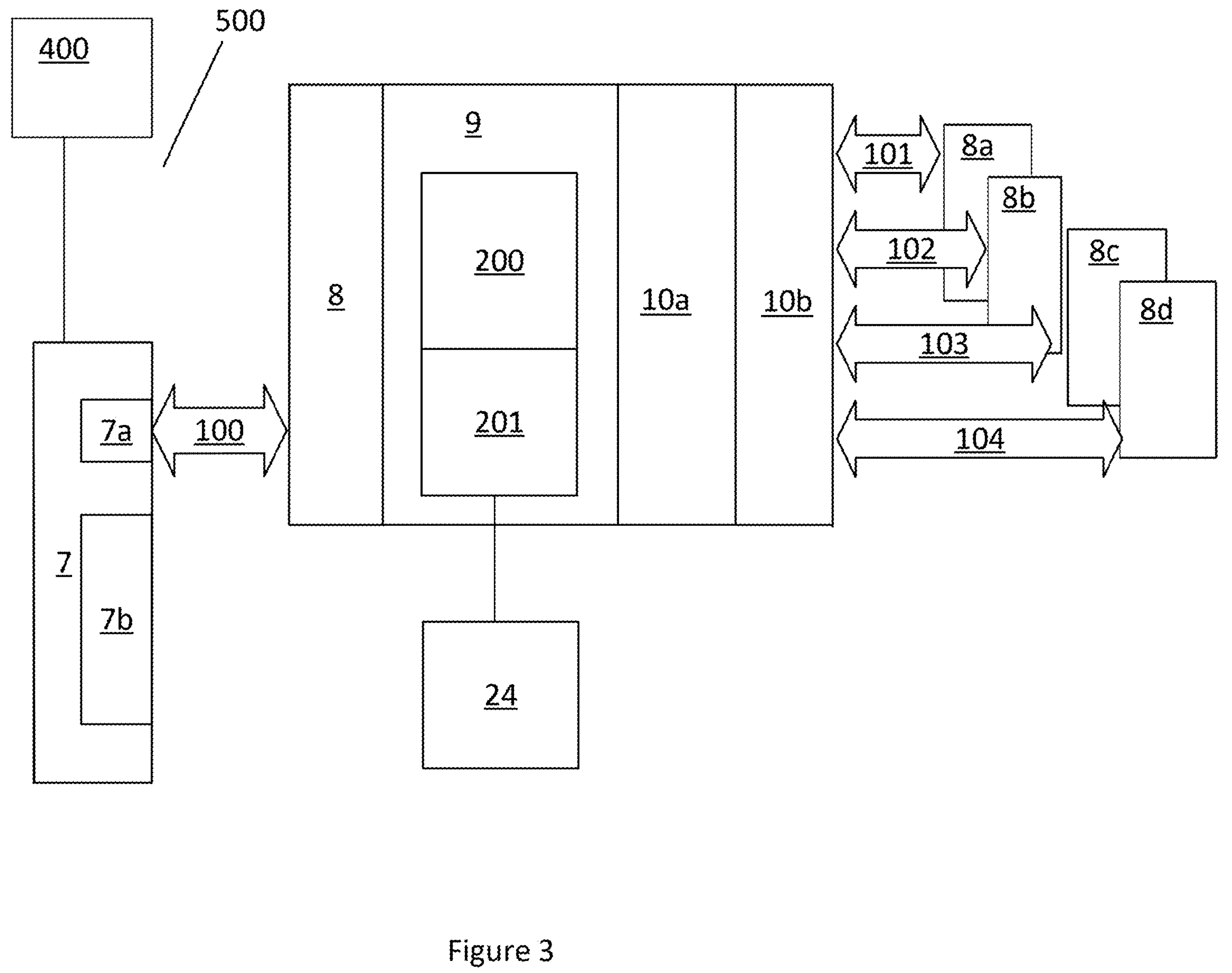

FIG. 3 depicts an exemplary basic structure of the software that is executed by the MCU 5. The IO-Link data exchange 100 with an external IO-Link Master is handled by the IO-Link Device Stack 8. Another software module is the IO-Link Master stack 10*b* that is responsible for IO-Link data exchange 101, 102, 103, 104 with the connected IO-Link devices 8. An AGG Device Application 9 including a configurable logic adapter 200 is responsible for processing data exchanged with IO-Link device stack 8 on one side and for processing data exchanged with the IO-Link Master 10*b* on the other side. The data exchange with the IO-Link Master 10*b* uses a standardized master interface 10*a* called "SMI".

Restrictions of the AGG Device

According to embodiments of the invention, if an IO-Link master sends process data "PD" to a Device, these data are called in the IO-Link interface and system specification PDOut. If an IO-Link Master receives PD, these data are called PDIn. The total size of the Process data for an IO-Link Device is limited to 32-bytes PDOut and 32-bytes PDIn. If the direction of the data flow is not important for a consideration, the suffices In/Out are skipped in the subsequent description.

One restriction of an AGG Device according to embodiments of the invention is based on the fact that the accumulated PDIn/PDOut of 4 arbitrary IO-Link Devices 8 connected to an the AGG-Device 3 may sum up to 128-bytes in every direction. In such cases, a selection is needed that specify which process data are transferred over the IO-Link interface 100 to the external master 7. It is another task of the AGG-Device-Application 9 to do respective selection.

According to embodiments of the invention, another restriction of the AGG-Device arises from the duration, needed to transfer a certain amount of data, serialized over the IO-Link line. In the IO-Link System and Interface specification, an expression for an estimate of this duration is given in chapter A.3.6 M-sequence time.

$$t_{M-sequence} = 11(m+n)T_{BIT} + t_A + t_1(m-1) + t_2(n-1)$$

Here m is the number of bytes sent from the IO-Link Master to the Device, n is the number of the Device to the IO-Link Master, $T_{BIT}$ is the duration needed to transfer one bit with $$T_{BIT} = \frac{1}{Baudrate},\ 1\,T_{BIT} \le t_A \le 10\,T_{BIT},\ 0\,T_{BIT} \le t_1 \le 10\,T_{BIT} \text{ and}$$
$$0\,T_{BIT} \le t_2 \le 3T_{BIT}.$$

The formula shows how the time to transfer data increases with its amount. For the minimum cycle time of an IO-Link Device the following inequality $t_{cycle} > t_{M-sequence}$ must always hold.

Thus, the minimum cycle time of the AGG Device 3 might become bigger than the minimum cycle time of the connected IO-Link Devices 8 if the process data size of the AGG Device is bigger.

Direct Process Data Mapping

As already mentioned, PDIn or PDOut have a fixed byte length for a given m-sequence type. The structure of the process data, as defined in the IODD, splits the process data into smaller elements with given data types, here called data elements.

An example of a typical process data structure is given in FIG. 4. Here, a process data with a total size of 4 bytes is divided into 5 typed data elements 11: A 16-bit integer representing a distance, 2 bools representing thresholds, a 14-bit integer representing a level and an 8-bit integer representing a temperature. The data structure and the physical units of the data elements are specified in the electronic data sheet IODD of the IO-Link device.

Figure 11:
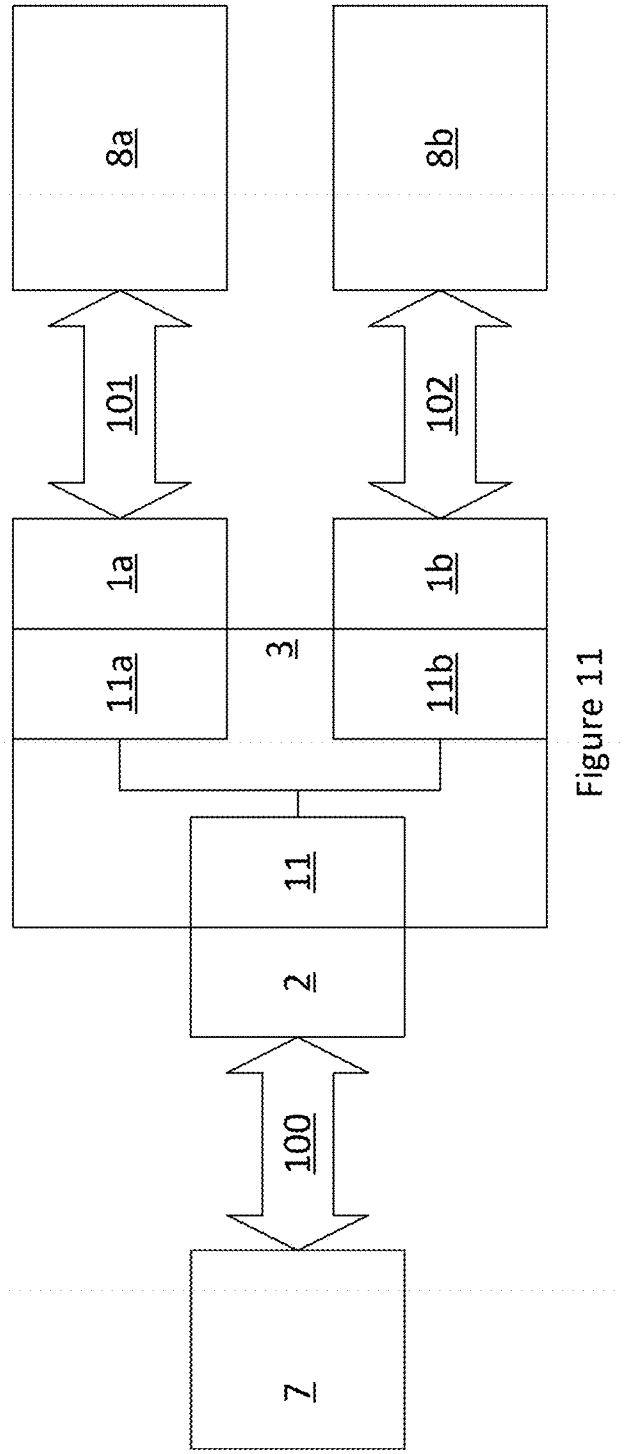
Figure 12:
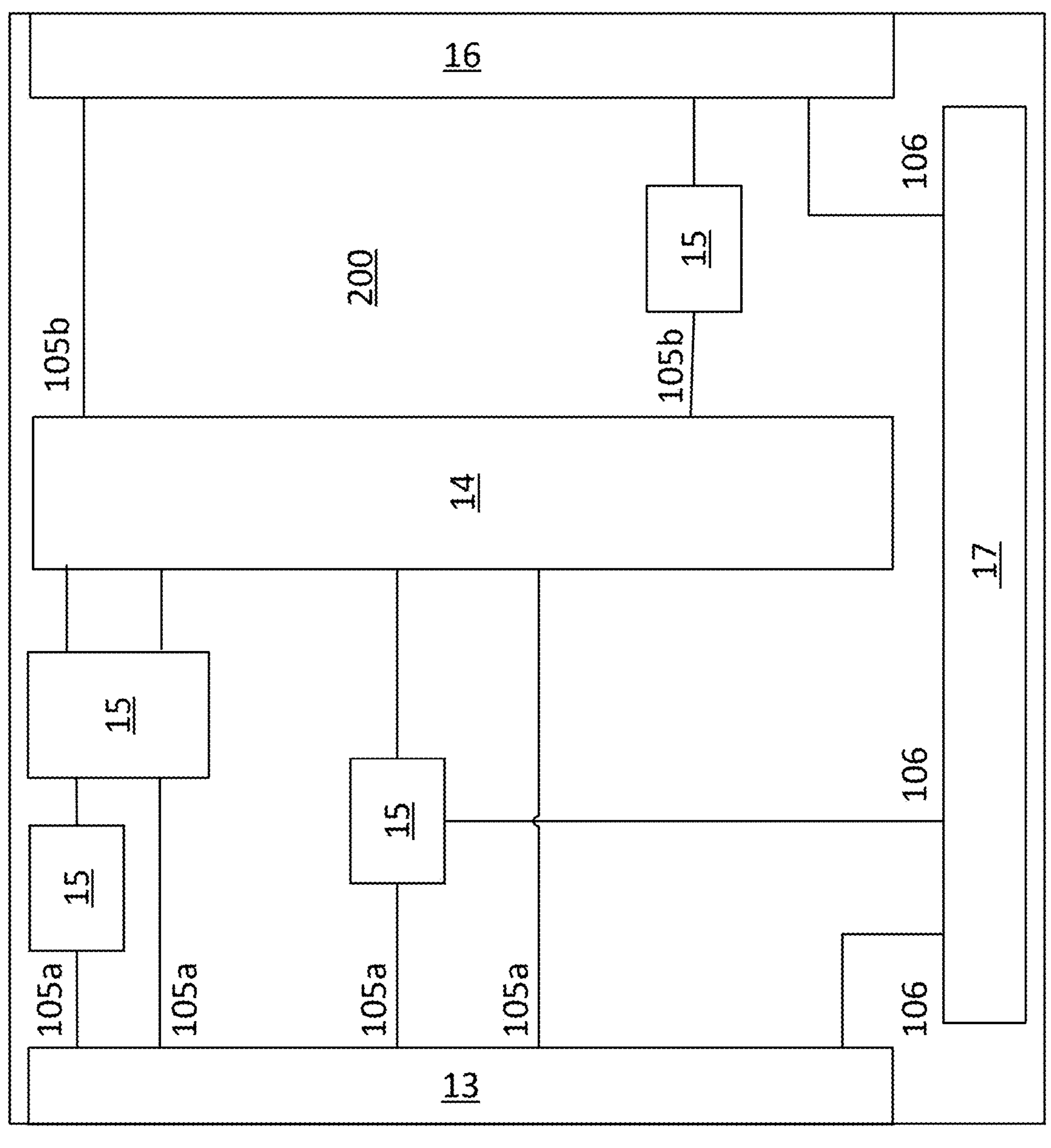

According to embodiments of the invention, the direct mapping between process data between the AGG Device Port 2 and the AGG Master Ports may be done in a 2-step approach as shown in FIG. 11 for two connected devices. In a first step, data elements 11*a* and 11*b* of the Devices 8 connected to the incoming AGG Master Ports 1*a*, 1*b* may be selected. The selection is based on the given PD structure of the connected devices as specified in the IODD. In a second step these data elements may be combined to form the process data structure of the AGG Device Port 2 as combination 11 of selected data elements 11*a* and 11*b*. The combination of data elements is specified with the help of a configuration tool that allows to combine PD elements in a flexible way.

Direct mapping of process data, however, may provide only a solution for the first scenario-port extension.

Configurable Logic Adapter

According to embodiments of the invention, other scenarios require a more complex device application that allows routing and processing of the process data. A practical solution for this task poses considerable challenges because it must fulfill certain requirement to be generally applicable in automation systems. These requirements are:

The device application shall be usable for arbitrary IO-Link devices 8 connected to the master ports 1.

The device application 9 shall allow routing of process data elements 11 between one IO-Link device and other IO-Link Device 12*a* and between IO-Link Devices and the external master 12*b* as shown in FIG. 5.

Configurable Logic Adapter CLA

Embodiments of the invention provide a new solution to these requirements with a structure, called in this context configurable logic adapter "CLA" 200, which can be part of the device application 9 is shown in FIG. 6. The CLA is based on a fixed structure. Only a configuration is needed to resolve the required scenarios. In particular it is not needed to change software. Thus, the CLA can be qualified once for its basic functionality and stability because a reconfiguration of the CLA will not affect basic properties of the CLA like stability or integrity.

CLA Data Types

According to embodiments of the invention, the CLA uses only two data types, called scalars 105 and bools 106 which are handled differently. Scalars may be used to transfer numerical process data in a generic way. Thus, their value range should be sufficiently large to handle all numerical process data without significant loss of accuracy. In preferred realization of the CLA the data type FLOAT32 "float" according to IEEE754 is used. However other data types like DOUBLE would also fulfill these requirements.

According to embodiments of the invention, the conversion of process data elements 11 into scalars changes their types into float. The conversion into scalars or bools may only be applicable for process data element types: BooleanT, UIntegerT, IntegerT and Float32T (see A. 1.4 of the IO-Link Interface and System specification). The remaining types (TimeT, TimeSpanT, StringT and OctetStringT) can particularly only be used for the previously mentioned direct mapping and are not handled by the CLA.

Logical values 106 may be represented by two states "True" and "False". In a preferred realization of the CLA these states are mapped to a byte with the byte value 0 mapped to False and any other byte value mapped to "True". Both data types may be used to transfer numerical information within the CLA.

CLA Blocks

According to embodiments of the invention, CLA blocks can have scalars or bools as input data and produce new scalars or bools as output data. The process of generating the output data may be defined by an algorithm that executes a finite number of steps. The execution of the steps may be triggered by an event called "block cycle" in this context.

With a main cycle "cycle" all the block cycles for all CLA blocks may be executed in a well-defined configured order at a specific point in time.

In a preferred embodiment of this invention, the order of execution is chosen in a way that any scalar that is input of a current block must be evaluated prior to the execution of the current block. The initial input scalars from the data elements are all sampled at this main cycle which is the beginning of the cycle.

In a preferred embodiment of this invention there are 6 types of blocks defined.

(1) Distributor blocks 13 are characterized by taking process data elements as input and generating scalars or bools as output.

(2) Processing blocks 15 are characterized by take scalar or bools as input and generate scalars or bools. In a preferred embodiment of this invention, processing blocks must have identical number of incoming and outgoing scalars.

(3) Binarizer blocks 15*a* are special processing blocks characterized in having at least one input scalar, no output scalars and at least one bool output.

(4) Logic blocks 17 that have only bools as input or output.

(5) Combiners 14 that are characterized in having multiple input scalars but only one output scalar.

(6) Merger blocks 16 are characterized by having one input scalar that may be routed to various outgoing process data elements.

(7) Signal generators 18 that are generating simple signals cyclically within being connected to an IO-Link signal.

CLA Operation

According to embodiments of the invention, process data sources are considered as data inputs devices 2*i*, 1*ai*, 1*bi*, 1*ci*, 1*di* and 18 and shown on the left side of FIG. 6. Incoming process data elements are selected and converted by the distributor block 13 into scalars or bools. Details on selection and conversion are configurable.

In a preferred embodiment of the CLA, the conversion from data elements into scalars is adapted by a scale factor and an offset. For example, an IntegerT type is converted to a scalar by an operation that realized the following equation:

$$\text{Scalar}_i = \text{scale} * \text{float}(\mathit{IntergetT}) + \text{offset}$$

According to embodiments of the invention, the conversion from a data element to bools requires a quantization step if the data element is not of the type bool. The quantization step may be done by an operation that realizes the following inequality:

$$\text{bool} = (\text{data element} \geq \text{threshold})$$

Scalars and bools may be handled differently in the configurable logic adapter.

Signal Generators

To support simple sequencing logic, according to embodiments of the invention, an artificial Device Port 18 can be added to the AGG Device that generates some simple value sequences like a counter. The counter output can be used generate control signals, needed for the sequencing logic.

Handling of Scalars

According to embodiments of the invention, input scalars 105*a* may be routed from the distributor 13 to the combiner block 14. It is possible to insert processing blocks 15 into the route. In a preferred embodiment of this invention the number of scalars that are input to a processing block is identical to the number of scalars that are output of a processing block. Processing blocks between distributor and combiner are also referred to as pre-processing blocks.

Output scalars 105*b* may be routed from the combiner 14 to the merger 16. It is possible to insert processing blocks 15 into the into the route. Processing blocks between combiner are merger are referred to as post-processing blocks.

The operation of a processing block may be specified by a procedure that executes operations on the input scalars to generate output scalars. A processing block may contain state memory. A typical example of a processing block with one input scalar and one output scalar is a moving averaging block that generates the average of the last N input samples as output sample.

A processing block with 2 input scalars may be a coordinate conversion block that converts from cartesian coordinates (x, y) into polar coordinates (amplitude and phase). But also processing blocks that require configurable coefficients may be supported, like a finite impulse response "FIR" filter block, that executes an operation as defined in the equation $$y(n)=\sum_{i=0}^{N-1}h(i)x(n-i),$$

where x(n) represents the input scalar, y(n) the output scalar and h(i) are the filter coefficients.

It is an important characteristic of embodiments of this invention, that scalars cannot be used to generate a direct feedback loop within the CLA.

Combiner 14

Figure 7:
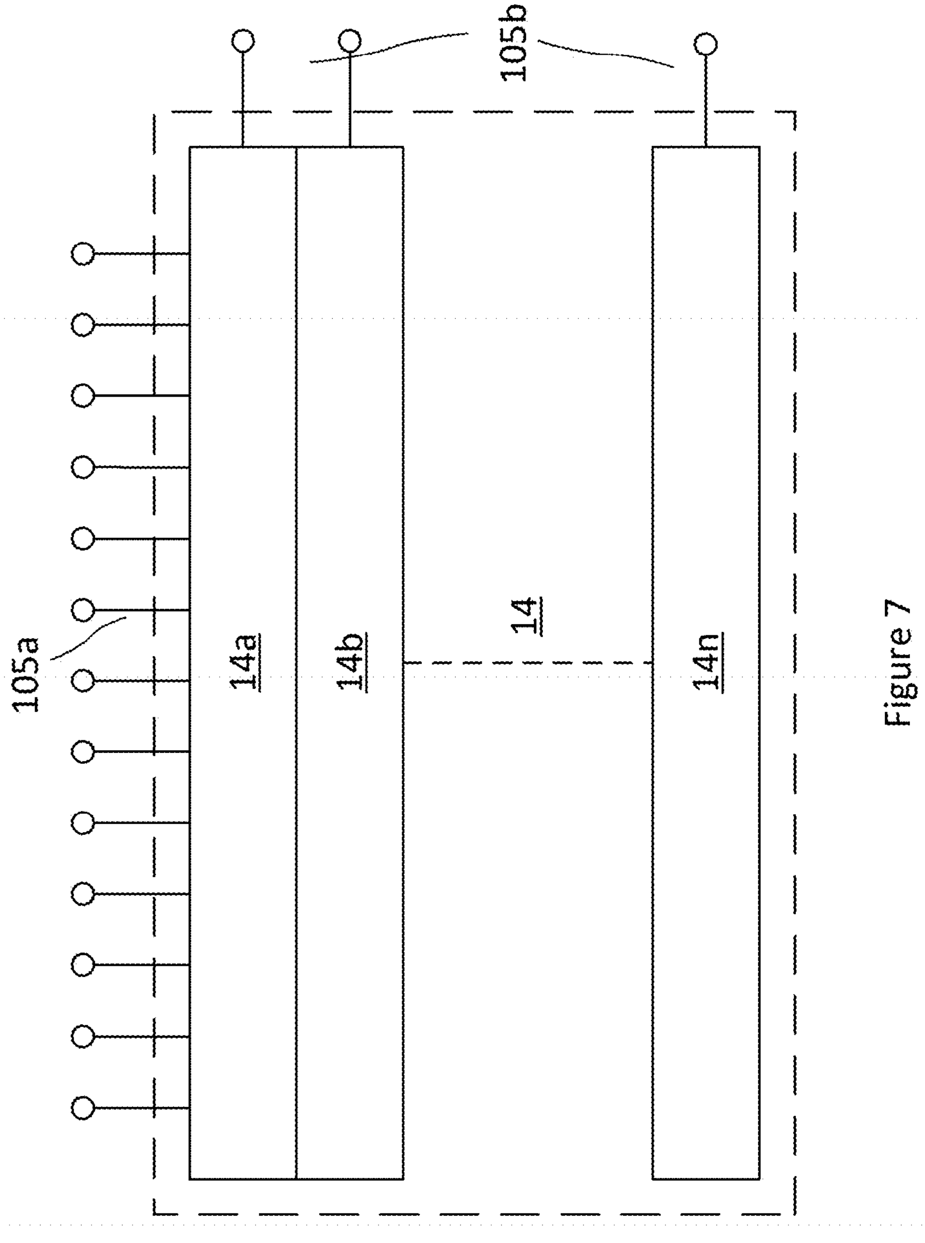
Figure 8:
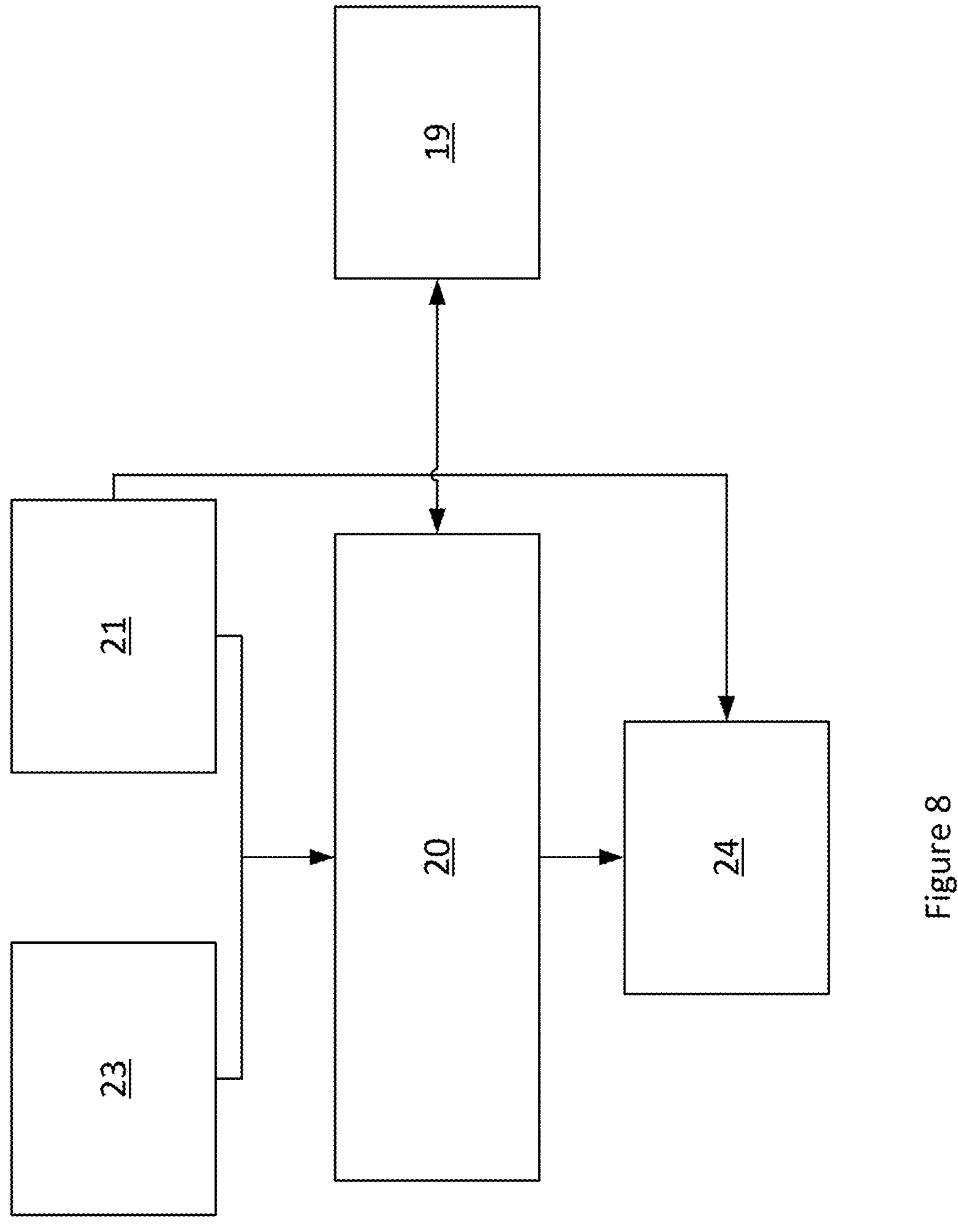
Figure 10:

FIG. 7 depicts an exemplary structure of the combiner block 14. The combiner block is organized in rows. Every row can combine arbitrary input scalars and generates one output scalar. The number of rows 14*a* . . . 14*n* of the combiner block is configurable.

Preferred embodiments of the combiner operation are described by the following equations:

$$so(j)=\sum_{i=0}^{I-1}c(i)*si(i)^{m(i)}+o(i)$$

$$so(j)=o(j)+c(j)\prod_{i=0}^{I-1}si(i)^{m(i)}$$

A first preferred embodiment allows a linear combination of all input scalars. If for example, if input scalar si(0) represents a first distance measured by Device 8*a* and scalar si(1) represents a $2^{nd}$ distance measured by another Device 8*b*, a simple linear combination with 1=2, c(i)=1, m(i)=1 and o(i)=0 will lead to an operation, that evaluates the sum of both distances so(j)=si(0)+si(1).

The second preferred embodiment is bound to the product of input scalars. If for example, if input scalar si(0) represents a current I measured by device 8*a* and if scalar si(1) represents a Voltage U measured by device 8*b*, the product term with o(j)=0, c(j)=1, m(i)=1 will lead to an operation that evaluates an electrical power as product of both scalars so(j)=si(0)*si(1)=U*1.

Merger 16

Finally, according to embodiments of the invention, the merger block 16 may be used to reconvert scalars and bools back into data elements 11*a* . . . 11*f*. The merging process may require a quantization step. In order to convert a scalar into a data element in a preferred embodiment of the invention, a linear operation may be applied to the output scalar so(j).

$$DataElement=\mathrm{Limit}(\mathrm{Integer}((so(j)*\mathrm{scale}+\mathrm{offset}))$$

The scale factor and to offset are configurable to provide appropriate matching of the output scalar value range to the limited data range of the data element. For an 8-bit integer, all float values smaller than −128 would be mapped to −128 and all float values>127 would be mapped to 127. The non-integer part of the float value will be discarded.

The outgoing merged data elements 11*a* . . . 11*f* may be send to the output ports 2*o*, 1*ao*, 1*bo*, 1*co* 1*do*. The output port 2*o* and the input port 2*i* may be physically realized as the AGG Device port 2. The output port 1*ao* and the corresponding input port 1*ai* may be physically realized by the same master port 1*a* and so forth.

Handling of Bools

According to embodiments of the invention, bools may be arbitrarily routed from input data elements to output data elements. The order of processing bools may not be specified. Every block that uses a bool value will use the value that is stored prior to the execution of the block. A result of a Boolean operation is stored and made accessible to other blocks for the next cycle.

Thus, every bool may contain a delay. This allows the realization of feedback with Bools without generating instable recursions. A conversion from scalar to bools can be done by binarizer blocks 15*a*.

Configuration of the CLA

According to embodiments of the invention, the requirement to have a simple configuration of the CLA without the need for programming and with consideration of the limited resources of the AGG hardware may be realized as follows. The set-up of the device application shall be simple and shall not include any programming and it shall consider available memory resources of the AGG Device hardware. The device application shall be flexible and there shall be means for extensions to meet future requirements. The requirements for the CLA can easily be resolved if the operations that shall be executed by the CLA are realized by a software program. Such a solution however requires software engineers to write an appropriate program which has to be adjusted or modified for any change and retested. Such a program will typically be written in a programming language, which is interpreted which requires interpreter software running within the CLA—and makes execution of code slow.

Configuration Tool

FIG. 20 shows an example how a configuration tool "CLA-Composer" 20 may be provided that can be running on a PC. The configuration tool (see FIG. 8) has a functionality to import the IODD files 23 of connected IO-Link devices. The IODD contains information of the process data elements of the connected IO-Link devices. The TCLA offers to the user also a list of processing blocks for insertion. The list of processing blocks refers to the processing blocks are available in the current AGG device. The details of the processing blocks are described in well-defined XML-files called Processing Block Descriptor "PBD" files 21.

According to embodiments of the invention, if new requirements show up, for example the need for a data transformation from the time domain, the existing processing blocks need to be extended. In this case the existing firmware of the AGG-Device may be upgraded with the new processing block by means of a firmware update.

Figure 9:
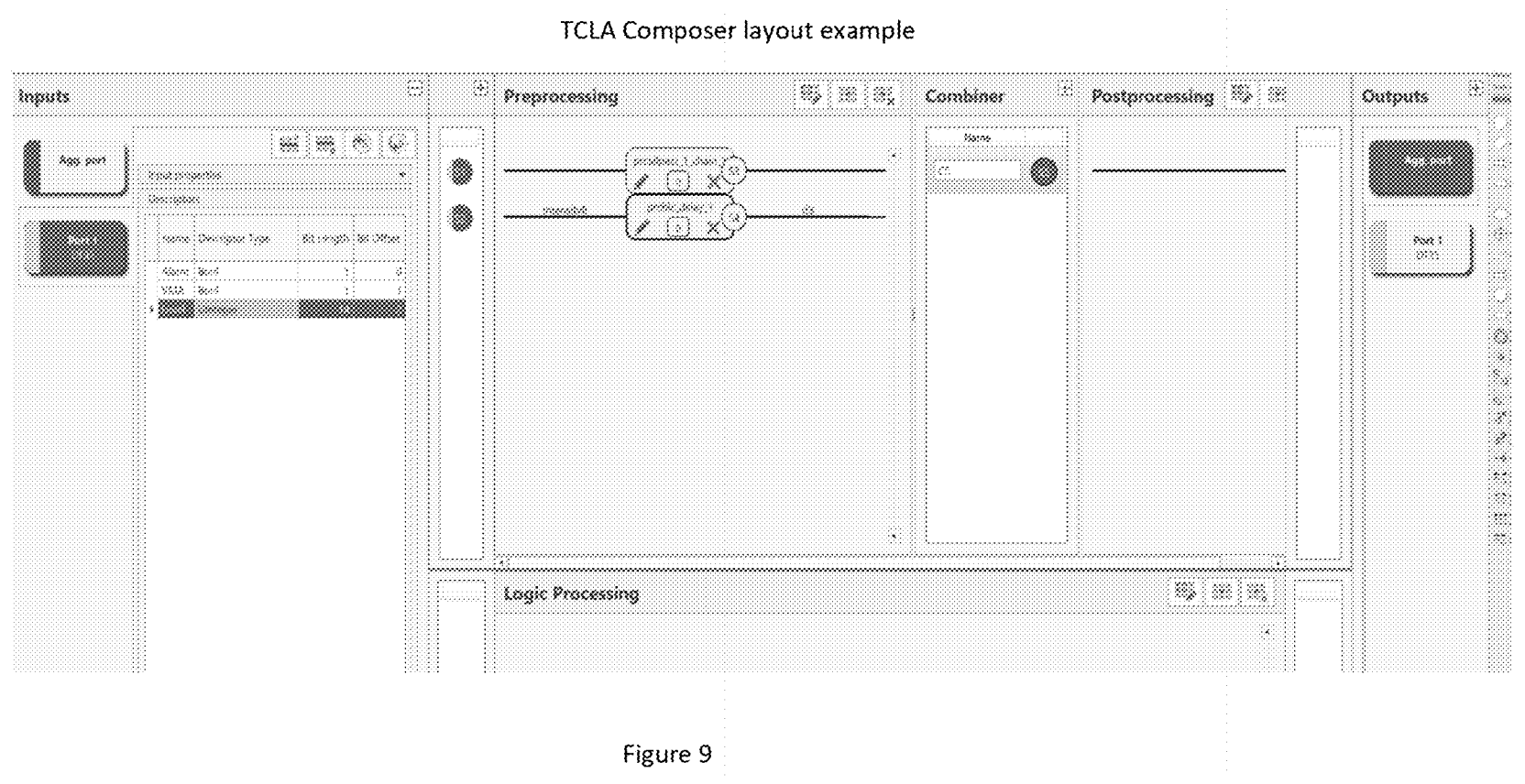

FIG. 9 shows an example of a layout of the CLA. The process data elements 'Alarm', 'VMA' and 'Level' shown in the example under inputs are taken from the imported IODD of the connected device. The data element "Level" in the example is mapped to two Scalars "S1" and "S2". The signals are passed in the example through 2 processing blocks 'prcallpass_1_chain_1' and 'prcblc_delay_1'. The blocks can be inserted into scalar-lines by GUI components of the TCLA-composer tool.

Configuration Transfer Between TCLA Composer and AGG Device

According to embodiments of the invention, after the routing of Bools and Scalars is finished and all blocks are configured, the configuration needs to be transferred the AGG Device.

As the AGG Device has limited resources, especially limited memory, it is desirable to do resource checking already during the configuration phase. This is particularly achieved by generating an image of the complete volatile memory within the composer 24.

The CLA can check if the generate memory image fits into the memory area that is reserved in the AGG before the transfer is executed. The memory image may be downloaded to the AGG Device by an IO-Link feature called BLOB transfer.

The AGG Device application may contain a parser 201 the memory image 24 in order to link coefficients, storage elements etc. to the CLA 200. The parsing depends on a formal description of the memory image. An example of the element "BLOCK" is given below.

```
Block(op_id, p_version, num_scalars, num_bool_in, num_bool_out) {
  level_start
  BlockIdentification(op_id, p_version)
  Array(typeid = Scalar_ID, num_scalars, typesize = 8)
  Array(typeid = Bool_ID, num_bool_in, typesize = 4)
  Array(typeid = Bool_ID, num_bool_out, typesize = 4)
  ArrayList
  level end
}
level_start: 0x00, 0x00, 0x20, 0x00
            (increments level count)
level_end: BaseArray(level_end, 0, 0) = 0x00, 0x00, 0x30, 0x00
```

The memory image 24 of the processing blocks may be uniquely linked to the structural description of the PBD files 21. Thus, the requirement of extensibility is met, if the new processing block is described by the PBD.

In a preferred embodiment of the invention, during parsing identified parts of the memory can be reorganized (e.g. to support different ENDIANESS). In particular, elements of the memory image that do only contain data to support proper parsing, can be reused by the application after parsing by the algorithm.

Alternative Scenario of the CLA

Figure 13:
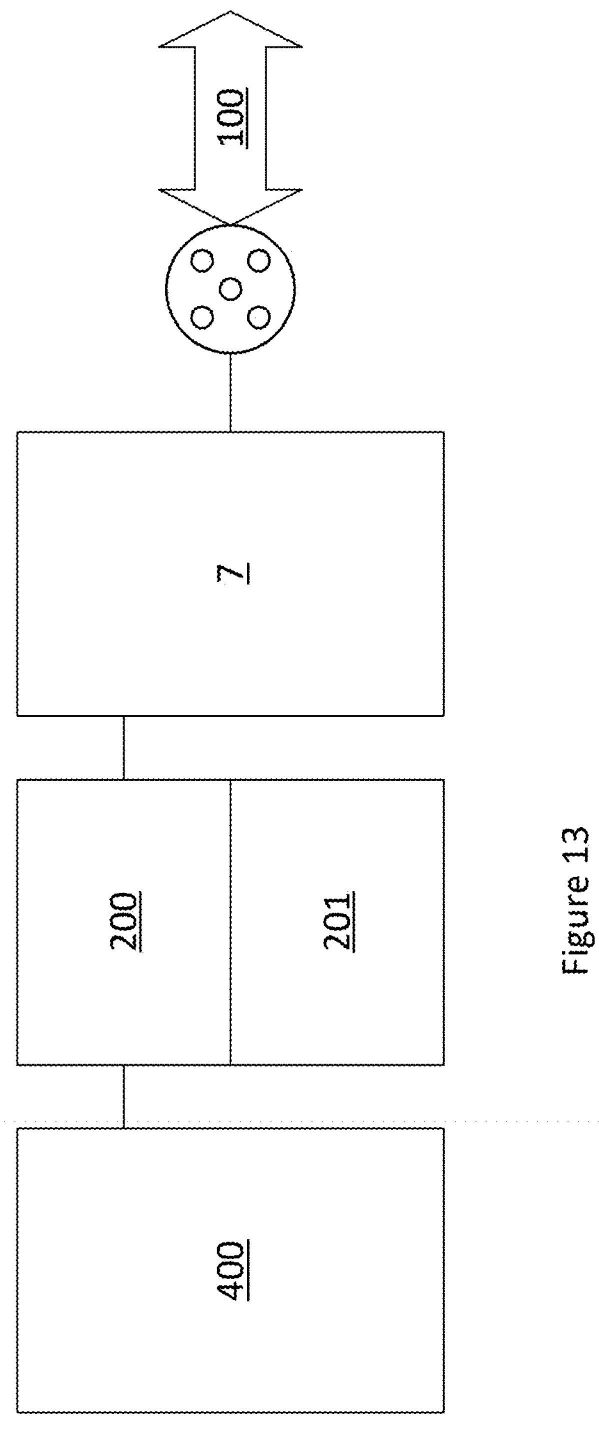

FIG. 13 shows another preferred embodiment of the CLA. The CLA 200 is now connected directly to the upper-level side of an external IO-Link master 7 that is controlling at least one IO-Link line 100. Data exchange between an upper-level system 500 which may be a PLC, a Webserver or another client of the IO-Link Master passes the CLA. The CLA may in this case be used to do signal shaping or feedback loops as described for the AGG Device.

Figure 14:
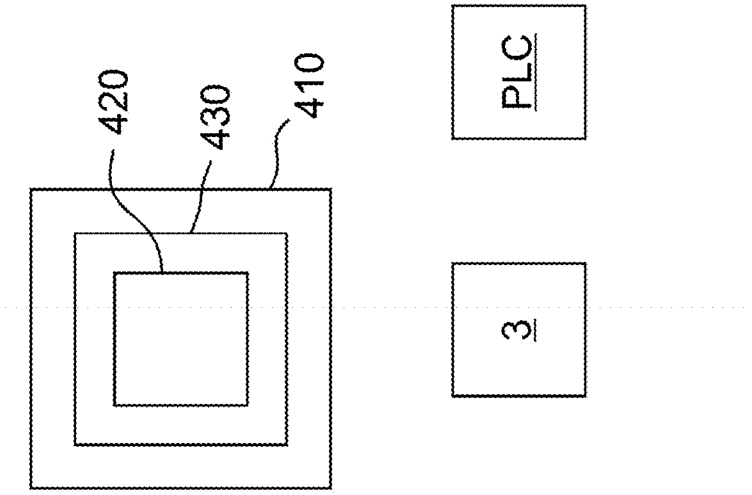
Figure 14:
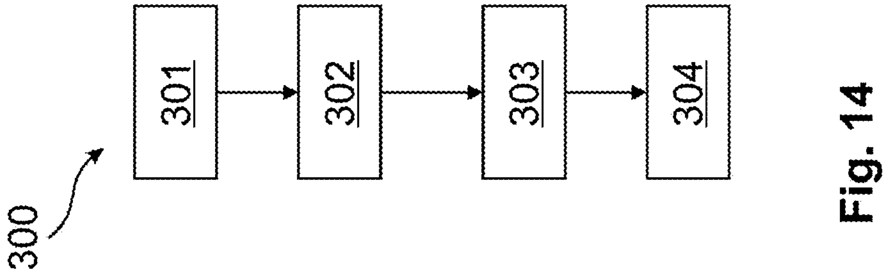

In FIG. 14, method 300 for processing incoming and/or outgoing data-elements 11 cyclically, the data-elements 11 representing numerical and/or logical values that are linked to an upper-layer application. According to a first method step 301, at least one or more of the data-elements 11 may be converted after a linear operation into at least one or more input scalar signals 105*a* of a generic data type, in particular an IEEE 754 float and/or, after an additional quantization, into at least one or more bool signals 106, the converting being particularly carried out by a distributor block 13. According to another method step 302, at least one or multiple combining operations may be performed, each combining operation comprising combining at least one or more of the input scalar signals 105*a* into one output scalar signal 105*b*, the combining operations being particularly performed by a combiner block 14. According to another method step 303, at least one or more of the output scalar signals 105*b* and/or of the bool signals 106 and/or of an output based on these signals 105*b*, 106 may be reconverted into one or more data-elements 11 after a linear operation and/or a quantization step, the reconverting being particularly carried out by a merger block 16. According to another method step 304, logic operations may be performed on at least one or more of the bool signals 106 and particularly both input and output for the bool signals 106 are provided, this step being particularly performed by a logic block 17. Also, processing blocks 15 may be inserted, particularly into one or more input scalar signals 105*a*, between the distributor block 13 and the combiner block 14 or, particularly into one or more output scalar signals 105*b*, between the combiner block 14 and the merger block 16.

FIG. 14 also visualized a computer program 420, a data processing apparatus 410, a system and a computer-readable storage medium 430 according to embodiments of the invention.

The foregoing explanation of the embodiments describes the present invention in the context of examples. Of course, individual features of the embodiments can be freely combined with each other, provided that this is technically reasonable, without leaving the scope of the present invention.

REFERENCE LIST

1 master ports
1*a* first (secondary) master port
1*b* second (secondary) master port
1*c* third (secondary) master port
1*d* fourth (secondary) master port
1*ao* output port
1*bo* output port
1*co* output port
1*do* output port
2 device port, device port connector, port to external Master
2*i* input port
2*o* output port
1*ai* input port
1*bi* input port
1*ci* input port
1*di* input port
3 apparatus, aggregator device, AGG
4 device PHY
5 micro controller unit, controller unit
6,
6*a*-6*d* Master PHYs
7 external IO-Link master, master device, external Master
7*a* port of 7
7*b* remaining ports
8 IO-Link Device Stack
8*a*,8*b*,8*c*,8*d* Secondary Devices
9 AGG device application, IO-Link Devices, secondary device
10*a* IO-Link Master Interface "SMI", Agg Device Application
10*b* IO-Link Master stack
11 Data Elements of Agg Device Port
11*a*, 11*b* Data Elements of embedded Master Ports
11*c* data element
11*d* data element
11*e* data element
11*f* data element
12*a* feedback route
12*b* transfer route
13 Distributor
14 Combiner
14*a* Combiner row a

14*n* Combiner row n
15 Processing Block
15*a* binarizer block
16 Merger Block
17 Logic Block
18 Signal Generator
19 CLA Configuration file
20 CLA
21 IODD files
22 PBD files
23 selected data elements
24 composer
PLC programmable logic controller
100 ext. IO-Link
101 IO-Link to Device 8*a*
102 IO-Link to Device 8*b*
103 IO-Link to Device 8*c*
104 IO-Link to Device 8*d*
105 Scalar-Signal
105*a* Input-Scalars
105*b* Output-Scalars
106 Bool-Signal
200 CLA
201 parser
300 method
301—
304 method steps
400 upper level system e.g. PLC
410 apparatus for data processing
420 computer program
430 storage medium
500 communication system

The invention claimed is:

1. An apparatus for processing incoming and/or outgoing data-elements cyclically, the data-elements representing numerical and/or logical values that are linked to an upper-layer application, the apparatus comprising:

a distributor block for converting at least one or more of the data-elements after a linear operation into at least one or more input scalar signals of a generic data type, in particular an IEEE 754 float and/or, after an additional quantization, into at least one or more bool signals, a combiner block for performing at least one or multiple combining operations, each combining operation comprising combining at least one or more of the input scalar signals into one output scalar signal, a merger block for reconverting at least one or more of the output scalar signals and/or of the bool signals and/or of an output based on these signals into one or more data-elements after a linear operation and/or a quantization step, a logic block for performing logic operations on at least one or more of the bool signals and particularly for providing both input and output for the bool signals, and processing blocks that are configured to be inserted, particularly into one or more input scalar signals, between the distributor block and the combiner block or, particularly into one or more output scalar signals, between the combiner block and the merger block.

2. The apparatus of claim 1, characterized in that the processing blocks are configured to process the one or more input scalar signals and/or the one or more output scalar signals, for which they were inserted, particularly processing blocks that perform digital filtering operations or spectral transforms like fast Fourier transforms.

3. The apparatus of claim 1, characterized in that the blocks are configured to be processed in a well-defined order, preferably in a way that any input scalars of a current block are evaluated before the current block is evaluated.

4. The apparatus of claim 1, characterized in that the apparatus is configured to process the incoming and/or outgoing data-elements cyclically in a way that the bool signals that are evaluated in one cycle are given as input for a subsequent block in the following cycle.

5. The apparatus of claim 1, characterized in that the blocks and particularly the logic block are configured based on a configuration specification, the configuration specification being customizable by a user, thereby rendering the processing and particular the logic operations and/or the insertion of the processing blocks configurable, and the configuration specification particularly being stored in a storage medium.

6. The apparatus of claim 1, characterized in that the apparatus provides a configurable logic adapter that uses a configurable logic to process, preferably convert and/or select, the data elements of data received from at least one or multiple secondary devices and processes and/or combines the data elements to generate data to be sent to a master device.

7. The apparatus of claim 1, characterized in that the apparatus comprises an interface, the interface being provided to configure the processing and particularly a configurable logic by a user, thereby adapting the processing of the data elements to the upper-layer application, particularly an evaluation and/or control of at least one or multiple secondary devices, particularly sensors and/or actuators.

8. A system for providing a communication in an automation system, comprising:

a programmable logic controller (PLC) for providing an upper-layer application, particularly an automated control of industrial processes of the automation system, a master device for being connected to the programmable logic controller for providing a communication system, at least one or multiple secondary devices for being controlled and/or evaluated by the programmable logic controller via the master device, thereby carrying out the upper-layer application at least partially, the apparatus claim 1 for connecting the at least one or multiple secondary devices to the master device, thereby providing a data exchange for the control and/or evaluation of the secondary devices via the communication system.

9. A method for processing incoming and/or outgoing data-elements cyclically, the data-elements representing numerical and/or logical values that are linked to an upper-layer application, the method comprising:

converting at least one or more of the data-elements after a linear operation into at least one or more input scalar signals of a generic data type, in particular an IEEE 754 float and/or, after an additional quantization, into at least one or more bool signals, the converting being particularly carried out by a distributor block, performing at least one or multiple combining operations, each combining operation comprising combining at least one or more of the input scalar signals into one output scalar signal, the combining operations being particularly performed by a combiner block, reconverting at least one or more of the output scalar signals and/or of the bool signals and/or of an output based on these signals into one or more data-elements after a linear operation and/or a quantization step, the reconverting being particularly carried out by a merger block, performing logic operations on at least one or more of the bool signals and particularly providing both input and output for the bool signals, the logic operations being particularly performed by a logic block, inserting processing blocks, particularly into one or more input scalar signals, between the distributor block and the combiner block or, particularly into one or more output scalar signals, between the combiner block and the merger block.

10. The method of claim 9, characterized in that the processing blocks process the one or more input scalar signals and/or the one or more output scalar signals, for which they were inserted.

11. The method of claim 9, characterized in that the number of scalar signals is not changed, when passing processing blocks.

12. The method of claim 9, characterized in that the blocks are processed in a well-defined order, preferably in a way that any input scalars of a current block are evaluated before the current block is evaluated.

13. The method of claim 9, characterized in that the bool signals that are evaluated in one cycle are given as input for a subsequent block in the following cycle.

14. The method of claim 9, characterized in that the processing of the data-elements comprises:

Inputting the data elements to a group of processing blocks, thereby generating an output of the group of processing blocks, Generating modified data-elements based on the output of the group of processing blocks, wherein connections and/or a structure of the group of processing blocks is defined by a customizable configuration of a logic.

15. A data processing apparatus comprising:

a processor; and a memory communicatively coupled to the processor and storing a computer program comprising commands, that when executed by the processor, cause the processor to:

convert at least one or more of the data-elements after a linear operation into at least one or more input scalar signals of a generic data type, in particular an IEEE 754 float and/or, after an additional quantization, into at least one or more bool signals, the converting being particularly carried out by a distributor block, perform at least one or multiple combining operations, each combining operation comprising combining at least one or more of the input scalar signals into one output scalar signal, the combining operations being particularly performed by a combiner block, reconvert at least one or more of the output scalar signals and/or of the bool signals and/or of an output based on these signals into one or more data-elements after a linear operation and/or a quantization step, the reconverting being particularly carried out by a merger block, perform logic operations on at least one or more of the bool signals and particularly providing both input and output for the bool signals, the logic operations being particularly performed by a logic block, and insert processing blocks, particularly into one or more input scalar signals, between the distributor block and the combiner block or, particularly into one or more output scalar signals, between the combiner block and the merger block.

16. A tangible, non-transitory computer-readable storage medium, comprising instructions which, when executed by a computer, cause the computer to:

convert at least one or more of the data-elements after a linear operation into at least one or more input scalar signals of a generic data type, in particular an IEEE 754 float and/or, after an additional quantization, into at least one or more bool signals, the converting beinq particularly carried out by a distributor block, perform at least one or multiple combining operations, each combining operation comprising combining at least one or more of the input scalar signals into one output scalar signal, the combining operations being particularly performed by a combiner block, reconvert at least one or more of the output scalar signals and/or of the bool signals and/or of an output based on these signals into one or more data-elements after a linear operation and/or a quantization step, the reconverting being particularly carried out by a merger block, perform logic operations on at least one or more of the bool signals and particularly providing both input and output for the bool signals, the logic operations being particularly performed by a logic block, and insert processing blocks, particularly into one or more input scalar signals, between the distributor block and the combiner block or, particularly into one or more output scalar signals, between the combiner block and the merger block.

* * * * *